US012240395B2

(12) United States Patent
Takamizawa et al.

(10) Patent No.: US 12,240,395 B2
(45) Date of Patent: Mar. 4, 2025

(54) ELECTRICAL JUNCTION BOX

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shun Takamizawa, Yokkaichi (JP); Shigeki Yamane, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 355 days.

(21) Appl. No.: 17/756,897

(22) PCT Filed: Nov. 20, 2020

(86) PCT No.: PCT/JP2020/043347
§ 371 (c)(1),
(2) Date: Jun. 3, 2022

(87) PCT Pub. No.: WO2021/111897
PCT Pub. Date: Jun. 10, 2021

(65) Prior Publication Data
US 2023/0007958 A1    Jan. 12, 2023

(30) Foreign Application Priority Data
Dec. 5, 2019   (JP) ................................ 2019-220180

(51) Int. Cl.
*H01R 12/00*     (2006.01)
*B60R 16/023*    (2006.01)
(Continued)

(52) U.S. Cl.
CPC ............ *B60R 16/0238* (2013.01); *G01K 1/08* (2013.01); *H02G 3/16* (2013.01); *H02G 5/08* (2013.01)

(58) Field of Classification Search
CPC ........ B60R 16/0238; G01K 1/08; H02G 3/16; H02G 5/08
(Continued)

(56) References Cited

U.S. PATENT DOCUMENTS 8,035,040 B2 *  10/2011  Nishikawa ........... B60R 16/0238
                                                    174/541
8,058,842 B2 *  11/2011  Kai ..................... H01M 10/486
                                                    320/152
(Continued)

FOREIGN PATENT DOCUMENTS

JP    2012-227038 A    11/2012
JP    2016-046937 A    4/2016

OTHER PUBLICATIONS

International Search Report, Application No. PCT/JP2020/043347, mailed Jan. 19, 2021. ISA/Japan Patent Office.

*Primary Examiner* — Abdullah A Riyami
*Assistant Examiner* — Vladimir Imas
(74) *Attorney, Agent, or Firm* — Honigman LLP

(57) ABSTRACT

An electrical junction box includes: a bus bar; a frame that holds the bus bar; and a temperature detection member that detects the temperature of the bus bar, wherein the temperature detection member includes a detection main body part capable of detecting temperature, and a wiring part extending from the detection main body part, and is held by one or more holding parts, the frame is integrally molded in a shape including a frame part surrounding a periphery of at least a part of the bus bar that includes a detection target portion to be subjected to detection by the temperature detection member, and at least one holding part of the one or more (Continued)

holding parts, and the at least one holding part of the one or more holding parts is provided so as to be located inward of the frame part.

10 Claims, 6 Drawing Sheets

(51) Int. Cl.
  *G01K 1/08* (2021.01)
  *H02G 3/16* (2006.01)
  *H02G 5/08* (2006.01)
(58) Field of Classification Search
  USPC .......................................................... 439/76.2
  See application file for complete search history.

(56) References Cited

U.S. PATENT DOCUMENTS

| | | | | |
|---|---|---|---|---|
| 8,264,204 | B2 * | 9/2012 | Nagaoka | B60L 58/22 |
| | | | | 320/136 |
| 8,378,236 | B2 * | 2/2013 | Matsui | H05K 7/026 |
| | | | | 174/541 |
| 8,605,450 | B2 * | 12/2013 | Kaneshige | H01M 10/425 |
| | | | | 361/752 |
| 8,709,627 | B2 * | 4/2014 | Matsushima | G01R 31/364 |
| | | | | 429/61 |
| 9,362,545 | B2 * | 6/2016 | Sugawara | H01M 50/213 |
| 9,543,711 | B2 * | 1/2017 | Nakayama | H01M 10/486 |
| 9,550,425 | B2 * | 1/2017 | Sugawara | B60L 3/0046 |
| 9,778,287 | B2 * | 10/2017 | Nakajima | G01R 15/202 |
| 10,749,323 | B2 * | 8/2020 | Haraguchi | H05K 7/20854 |
| 10,763,616 | B2 * | 9/2020 | Shimizu | H01M 50/296 |
| 11,038,245 | B2 * | 6/2021 | Mori | H01M 50/209 |
| 11,063,393 | B2 * | 7/2021 | Mozdzer | H01R 25/006 |
| 11,222,763 | B2 * | 1/2022 | Haraguchi | H01H 85/143 |
| 2003/0108789 | A1 * | 6/2003 | Yamakawa | H01M 50/588 |
| | | | | 429/178 |
| 2007/0015384 | A1 * | 1/2007 | Asao | H05K 7/026 |
| | | | | 439/76.2 |
| 2016/0028194 | A1 | 1/2016 | Nakayama et al. | |
| 2020/0328586 | A1 * | 10/2020 | Eriksen | H02H 1/0061 |

\* cited by examiner

ELECTRICAL JUNCTION BOX

CROSS-REFERENCE TO RELATED APPLICATIONS

This application is the U.S. national stage of PCT/JP2020/043347 filed on Nov. 20, 2020, which claims priority of Japanese Patent Application No. JP 2019-220180 filed on Dec. 5, 2019, the contents of which are incorporated herein.

TECHNICAL FIELD

The present disclosure relates to an electrical junction box.

BACKGROUND

JP 2016-46937A discloses a technique for fixing a thermistor wire to a stator core, using thermistor wire fixing clips.

Disclosure

According to the technique described in JP 2016-46937A, the number of components is increased by the number of thermistor wire fixing clips.

Therefore, an object of the present disclosure is to provide a technique that makes it possible to hold a temperature detection while keeping the number of components as low as possible.

SUMMARY

An electrical junction box according to the present disclosure is an electrical junction box including: a bus bar; a frame that holds the bus bar; and a temperature detection member that detects the temperature of the bus bar, wherein the temperature detection member includes a detection main body part capable of detecting temperature, and a wiring part extending from the detection main body part, and is held by one or more holding parts, the frame is integrally molded in a shape including a frame part surrounding a periphery of at least a part of the bus bar that includes a detection target portion to be subjected to detection by the temperature detection member, and at least one holding part of the one or more holding parts, and the at least one holding part of the one or more holding parts is provided so as to be located inward of the frame part.

Advantageous Effects of Disclosure

According to the present disclosure, it is possible to hold a temperature detection member with while keeping the number of components as low as possible.

DETAILED DESCRIPTION OF PREFERRED EMBODIMENTS

Figure 1:
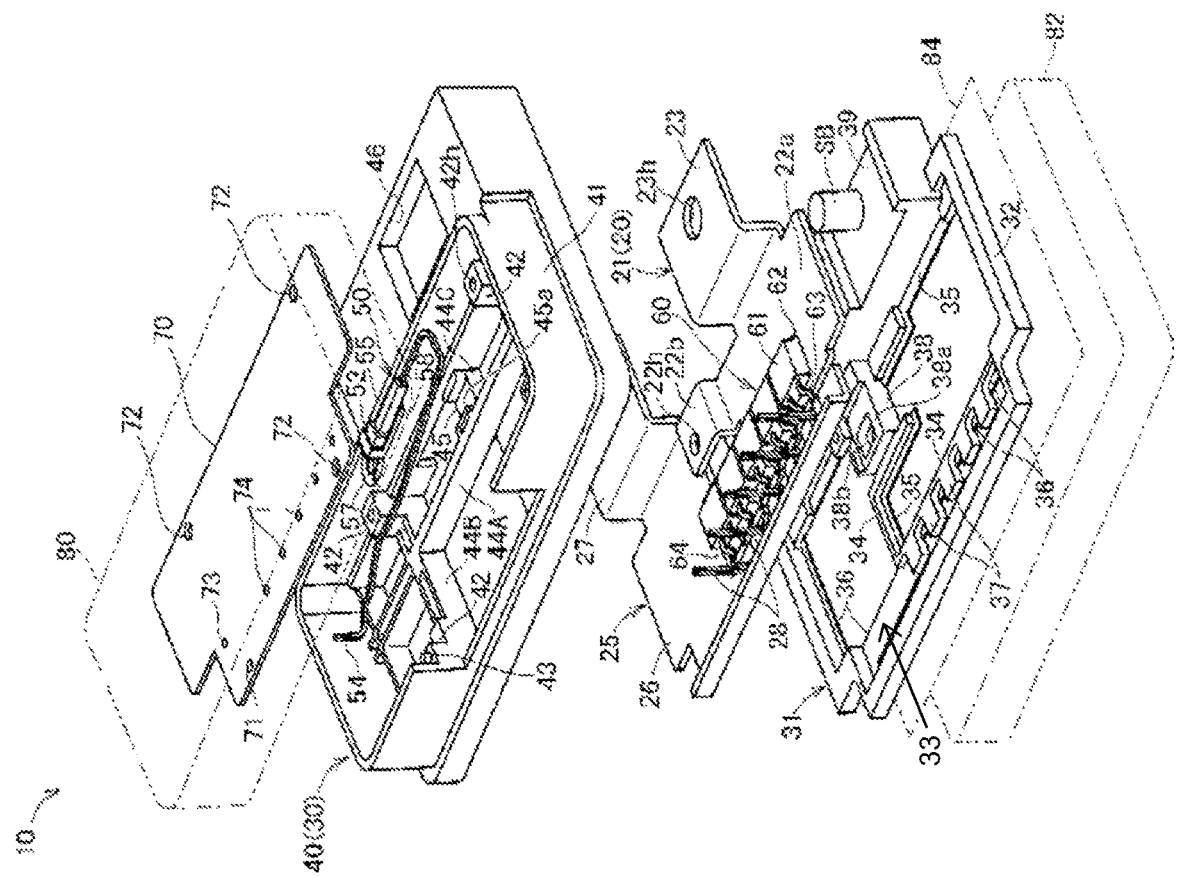
FIG. 1 is an exploded perspective view showing an electrical junction box according to Embodiment 1.

First, embodiments of the present disclosure will be listed and described.

An electrical junction box according to the present disclosure is as follows.

First Aspect

In a first aspect, an electrical junction box including: a bus bar; a frame that holds the bus bar; and a temperature detection member that detects the temperature of the bus bar, wherein the temperature detection member includes a detection main body part capable of detecting temperature, and a wiring part extending from the detection main body part, and is held by one or more holding parts, the frame is integrally molded in a shape including a frame part surrounding a periphery of at least a part of the bus bar that includes a detection target portion to be subjected to detection by the temperature detection member, and at least one holding part of the one or more holding parts, and the at least one holding part of the one or more holding parts is provided so as to be located inward of the frame part. Since the holding part that holds the temperature detection member is integrally molded with the frame that holds the bus bar, it is possible to hold the temperature detection member while keeping the number of components as low as possible.

Second Aspect

In a second aspect, one or more holding parts may include a proximal end portion holding part that holds a proximal end portion of the wiring part that extends continuously with the detection main body part. With this configuration, the detection main body part that is located close to the proximal end portion holding part is stabilized.

Third Aspect

In a third aspect, the temperature detection member may further include a thermal connection member that thermally connects the detection main body part and the bus bar to each other, and the one or more holding parts may include a connection portion holding part that holds a portion where the thermal connection member and the bus bar are thermally connected to each other. With this configuration, the thermal connection portion is further held.

Fourth Aspect

In a fourth aspect, a hole may be formed in each of the thermal connection member and the bus bar, each of the thermal connection member and the bus bar may be fixed by a bolt and a nut using the hole, the connection portion holding part may have a support surface that supports the bus bar, a recess may be formed in the support surface, and the nut may fit in the recess. This configuration allows the connection portion holding part to hold the nut.

Fifth Aspect

In a fifth aspect, the holding force of the connection portion holding part may be greater than the holding force of the proximal end portion holding part. The proximal end portion holding part is more likely to rattle than the connection portion holding part, and thus stress is less likely to be applied to the connection portion holding part Sixth Aspect In a sixth aspect, the thermal connection member may be supported by an upper surface of the bus bar at the connection portion holding part, and may be supported by a support surface of the proximal end portion holding part at the proximal end portion holding part, and the height of the support surface of the proximal end portion holding part may be lower than the height of the upper surface of the bus bar at the connection portion holding part. With this configuration, the bus bar and the thermal connection member easily come into surface contact with each other at the connection portion.

Seventh Aspect

In a seventh aspect, one or more holding parts may include a proximal end-side intermediate portion holding part that holds an intermediate portion of the wiring part, the proximal end-side intermediate portion holding part may be provided at a position next to the proximal end portion holding part in order from the proximal end portion toward a distal end portion along a direction in which the wiring part extends, and the holding force at the proximal end-side intermediate portion holding part may be weaker than the holding force of the proximal end portion holding part and the holding force of the connection portion holding part. With this configuration, the proximal end-side intermediate portion holding part is more likely to rattle than the connection portion holding part and the proximal end portion holding part, and thus stress is less likely to be applied to the proximal end portion holding part and the connection portion holding part.

Eighth Aspect

In an eighth aspect, one or more holding parts may include a first intermediate holding part and a second intermediate holding part that hold an intermediate portion of the wiring part at positions different from each other, a first groove that traverses a rib protruding from the frame part may be formed in the first intermediate holding part, a second groove parallel to the rib may be formed in the second intermediate holding part, the second groove may be formed to be longer than the first groove, and the intermediate portion of the wiring part may be accommodated in each of the first groove and the second groove. With this configuration, an excess length of the wiring part is absorbed by the second intermediate holding part.

Ninth Aspect

In a ninth aspect, the second intermediate holding part may be provided with a retaining piece protruding from an edge portion of an opening of the second groove so as to close the opening. With this configuration, the wiring part is prevented from being dislodged from the second groove that is longer than the first groove.

Tenth Aspect

In a tenth aspect, the first groove and the second groove may be open in directions opposite to each other. With this configuration, the wiring part is held at the first intermediate holding part and the second intermediate holding part from sides opposite to each other.

Eleventh Aspect

In an eleventh aspect, the electrical junction box may further include a circuit board to which a distal end portion of the wiring part is to be electrically connected, wherein the frame may include a first frame that supports the bus bar, and a second frame that supports the circuit board and that presses the bus bar toward the first frame, a positioning projection that positions the circuit board may be formed inward of the frame part of the second frame, and the rib in which the first groove is formed may extend from a circuit board supporting part on which the positioning projection is formed. With this configuration, the wiring part is held at a position close to the positioning projection.

Twelfth Aspect

In a twelfth aspect, the holding force at the first intermediate holding part may be weaker than a force holding the wiring part at an electrical connection portion between the wiring part and the circuit board. Stress is less likely to be applied to the electrical connection portion.

Specific examples of the electrical junction box according to the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

Figure 2:
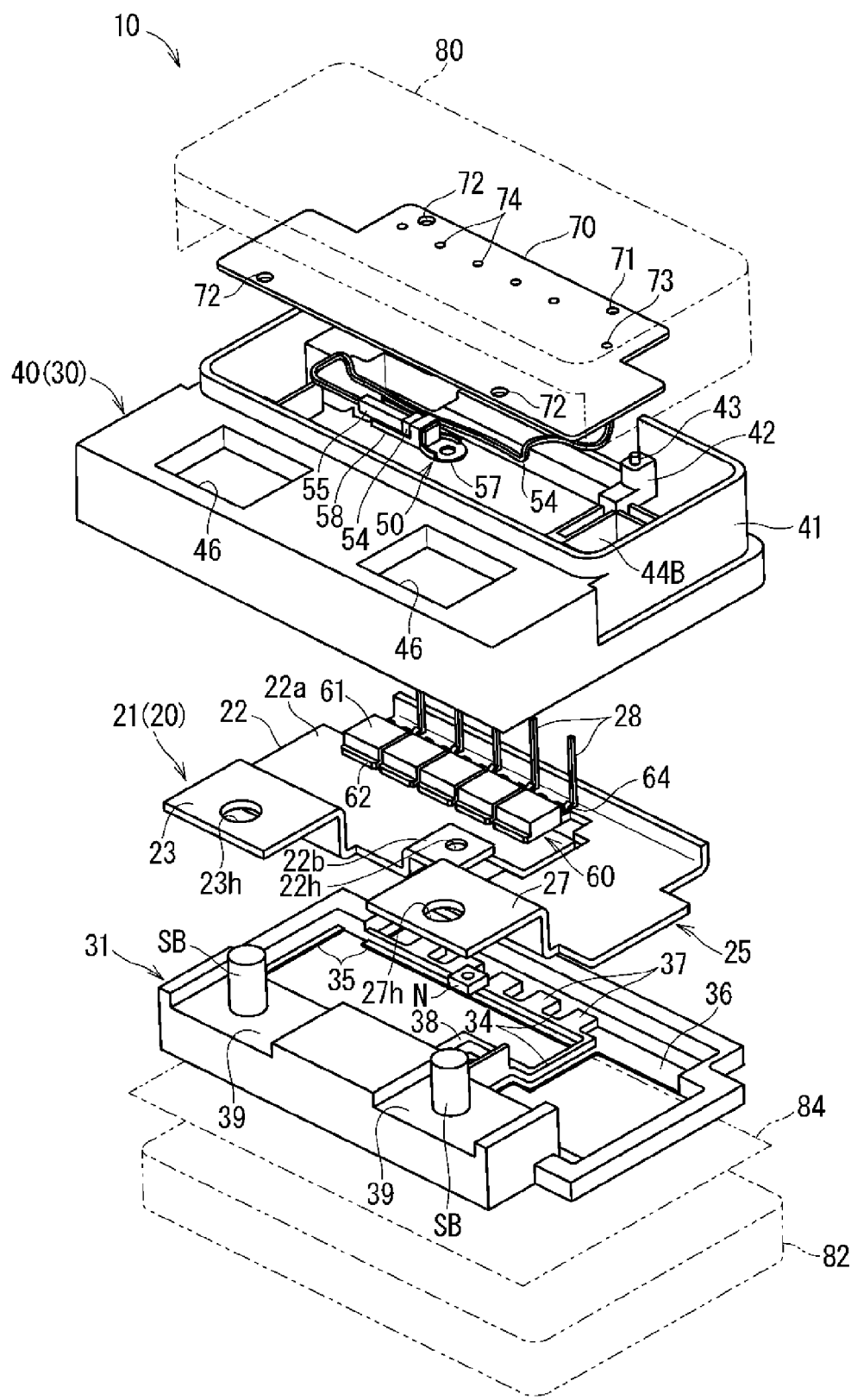
FIG. 2 is an exploded perspective view showing the electrical junction box according to Embodiment 1.
Figure 3:
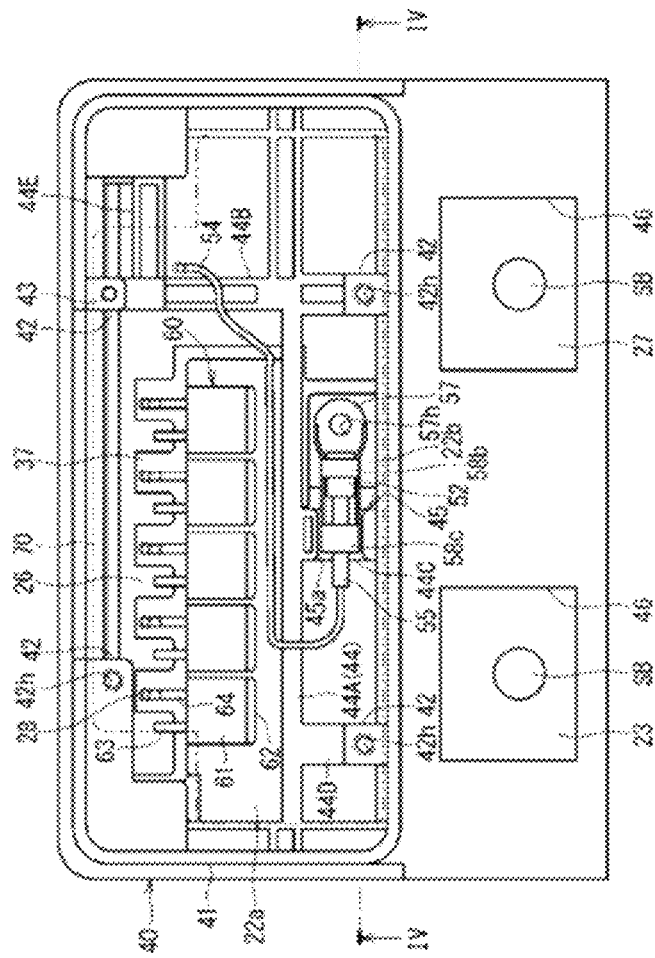
FIG. 3 is a plan view showing the electrical junction box according to Embodiment 1.
Figure 4:
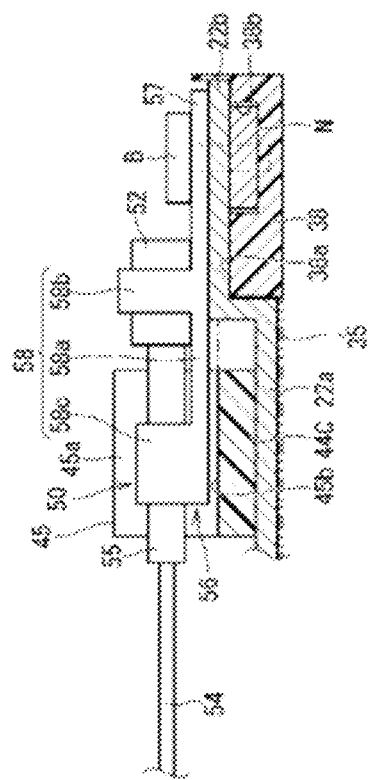
FIG. 4 is a schematic cross-sectional view taken along the line IV-IV in FIG. 3.

Below, an electrical junction box according to Embodiment 1 will be described. FIG. 1 is an exploded perspective view showing an electrical junction box 10 according to Embodiment 1. FIG. 2 is an exploded perspective view showing the electrical junction box 10 according to Embodiment 1. FIG. 3 is a plan view showing the electrical junction box 10 according to Embodiment 1. FIG. 4 is a schematic cross-sectional view taken along the line IV-IV in FIG. 3.

The electrical junction box 10 is mounted in a vehicle. The electrical junction box 10 is provided at an intermediate position of an electric circuit that connects a power supply (e.g., a main battery) and a first load (e.g., a headlamp or a wiper) to each other. A second load (e.g., a starter) is directly connected to the power supply. The electrical junction box 10 interrupts the connection between the power supply and the first load when a large current flows from the power supply to the second load, thereby protecting the first load from the adverse effects of a large current. Specifically, the electrical junction box 10 includes a bus bar 20, a frame 30, and a temperature detection member 50. The electrical junction box 10 further includes switching elements 60, a circuit board 70, a cover 80, a heat dissipation member 82, and an interposed member 84. Here, as the switching elements 60, a plurality of field-effect transistors (FETs: Field Effect Transistors) are provided. Here, the frame 30 is placed on the heat dissipation member 82. In the following, the direction in which the frame 30 is placed on the heat dissipation member 82 (the up-down direction in FIG. 1) will be referred as the up-down direction. The up-down direction may or may not coincide with a vertical direction in a state in which the electrical junction box 10 is mounted in the vehicle.

The bus bar 20 is connected to a plurality of field-effect transistors 60. The bus bar 20 includes a first bus bar 21, a second bus bar 25, and third bus bars 28. The first bus bar 21, the second bus bar 25, and the third bus bars 28 are insulated from each other. Each field-effect transistor 60 includes a drain terminal 62, a source terminal 63, and a gate terminal 64. The first bus bar 21 is electrically connected to the drain terminals 62. The second bus bar 25 is electrically connected to the source terminals 63. The third bus bars 28 are electrically connected to the gate terminals 64, respectively.

Specifically, the first bus bar 21 is a conductive plate such as a metal plate formed in a bent shape. The first bus bar 21 includes an in-frame accommodating part 22 and an outward extending part 23. The in-frame accommodating part 22 is a portion that is surrounded by frame parts 32 and 41, which will be described later. The in-frame accommodating part 22 includes a placement portion 22a and a detection target portion 22b. A main body 61 of each field-effect transistor 60 is placed on the placement portion 22a. The drain terminal 62 is provided at a lower portion of the main body 61 of the field-effect transistor 60. The first bus bar 21 is electrically connected to a plurality of drain terminals 62 on the placement portion 22a. The detection target portion 22b comes into contact with the temperature detection member 50. The detection target portion 22b is located on the upper side of the placement portion 22a. The detection target portion 22b extends continuously with the placement portion 22a via a rising portion. A through hole 22h is formed in the detection target portion 22b. The outward extending part 23 is a portion that extends outward of the frame parts 32 and 41. The outward extending part 23 is electrically connected to an external conductor at an external connection part 39, which will be described later. The outward extending part 23 is located on the upper side of the placement portion 22a and the detection target portion 22b. The outward extending part 23 extends continuously with the placement portion 22a via a rising portion. An insertion hole 23h for passing a stud bolt SB therethrough is formed in the outward extending part 23.

The second bus bar 25 is a plate-shaped conductor formed in a bent shape. The second bus bar 25 includes an in-frame accommodating part 26 and an outward extending part 27. The in-frame accommodating part 26 is a portion that is surrounded by the frame parts 32 and 41. The source terminals 63 are placed on a portion of the in-frame accommodating part 26. The second bus bar 25 is electrically connected to a plurality of source terminals 63 in the in-frame accommodating part 26. The outward extending part 27 is a portion that extends outward of the frame parts 32 and 41. The outward extending part 27 is electrically connected an external conductor at the external connection part 39. The outward extending part 27 is located on the upper side of the in-frame accommodating part 26. The outward extending part 27 extends continuously with the in-frame accommodating part 26 via a rising portion. An insertion hole 27h for passing a stud bolt SB therethrough is formed in the outward extending part 27.

Each third bus bar 28 is formed in a bar shape. The third bus bar 28 connects the field-effect transistor 60 and the circuit board 70 to each other. The third bus bars 28 are provided in a number corresponding to the number of field-effect transistors 60. One end portion of the third bus bar 28 is connected to the gate terminal 64. The other end portion of the third bus bar 28 is connected to the circuit board 70. As a member that connects the gate terminal 64 and the circuit board 70 to each other, a flexible wire such as a coated wire may be used in place of the third bus bar 28.

The frame 30 holds the bus bar 20. The frame 30 includes a first frame 31 and a second frame 40. The frame 30 is made of, for example, an insulating material such as a resin.

The first frame 31 supports the bus bar 20. The first frame 31 includes a frame part 32, a bus bar supporting part 33, and a connection portion holding part 38. The first frame 31 is an integrally molded article that has been integrally molded in a shape including the frame part 32, the bus bar supporting part 33, and the connection portion holding part 38.

The frame part 32 is formed in a tubular shape that is open at the top and the bottom. The frame part 32 surrounds the periphery of at least a portion of the bus bar 20 that includes the detection target portion 22b that is to be subjected to detection by the temperature detection member 50. Here, the frame part 32 surrounds the periphery of the in-frame accommodating parts 22 and 26. The bus bar supporting part 33 is provided inward of the frame part 32.

The bus bar supporting part 33 includes a partition part 34, and a first bus bar supporting part 35 and a second bus bar supporting part 36. The partition part 34 separates the first bus bar 21 and the second bus bar 25 from each other so as to prevent a short circuit from occurring between the first bus bar 21 and the second bus bar 25. The first bus bar supporting part 35 and the second bus bar supporting part 36 protrude inward from edges of the partition part 34 and the frame part 32. The first bus bar supporting part 35 and the second bus bar supporting part 36 are formed to have a thickness that is smaller than that of the partition part 34. The first bus bar supporting part 35 and the second bus bar supporting part 36 protrude from the lower surface side of the partition part 34 and the frame part 32. The first bus bar supporting part 35 protrudes in a cantilevered manner from the partition part 34, and supports edges of the first bus bar 21. A portion of the second bus bar supporting part 36 protrudes in a cantilevered manner from the partition part 34, and supports edges of the second bus bar 25. Another portion of the second bus bar supporting part 36 connects the partition part 34 and the frame part 32 to each other, and supports the entire second bus bar 25 in a partial region thereof along the width direction. In a state in which the first bus bar 21 and the second bus bar 25 are supported by the first bus bar supporting part 35 and the second bus bar supporting part 36, the upper surfaces of the in-frame accommodating parts 22 and 26 other than the detection target portion 22b are located at about the same height as the upper surface of the partition part 34.

The bus bar supporting part 33 further includes third bus bar supporting parts 37. The third bus bar supporting parts 37 support the third bus bars 28 so as to prevent a short circuit from occurring between the third bus bars 28 and the first bus bar 21 and the second bus bar 25. The third bus bar supporting parts 37 are formed adjacent to the partition part 34. The third bus bar supporting parts 37 are formed at the same height as the partition part 34. A portion of the second bus bar 25 that is connected to the source terminals 63 is formed in a comb-teeth shape. A plurality of the third bus bar supporting parts 37 are provided so as to be located between the comb teeth. A portion where the plurality of third bus bar supporting parts 37 and the partition part 34 that connects the third bus bar supporting parts 37 are formed also has a comb-teeth shape. The third bus bars 28 are individually supported by the respective third bus bar supporting parts 37.

The connection portion holding part 38 holds a portion where the first bus bar 21 and the temperature detection member 50 are thermally connected to each other. The connection portion holding part 38 has a support surface 38a. The support surface 38a supports the detection target portion 22b of the first bus bar 21. A recess 38b is formed in the support surface 38a. A nut N is fitted in the recess 38b. For example, the recess 38b may be formed to be smaller than the nut N, and the nut N may be press-fitted into the recess 38b. The recess 38b may be formed to have the same size as, or to be larger than the nut N, and the nut N may be fitted therein without being press-fitted. The support surface 38a is formed at a higher position than the upper surface of the partition part 34.

The first frame 31 is provided with external connection parts 39. Here, two stud bolts SB are provided for connection to external conductors. Two stud bolt mounting parts are formed on the first frame 31 as the external connection parts 39. The first frame 31 is integrally molded in a shape also including the two stud bolts mounting parts. After molding the first frame 31, the stud bolts SB are mounted to the respective stud bolt mounting parts. The stud bolts SB can be removed from the respective stud bolt mounting parts. When molding the first frame 31, the stud bolts SB may be used as insert components.

The first bus bar 21 is attached to one of the two stud bolts SB using the outward extending part 23. The second bus bar 25 is attached to the other of the two stud bolts SB using the outward extending part 27. The power supply is connected to one of the first bus bar 21 and the second bus bar 25 via an external conductive wire. The first load is connected to the other of the first bus bar 21 and the second bus bar 25 via an external conductive wire. For example, a terminal is provided at an end portion of each of the external conductive wires. A stud bolt insertion part is formed in the terminal through which the stud bolt SB is passed. As a result of a nut N being fastened to the stud bolt SB in a state in which the stud bolt SB has been passed through the first bus bar 21 or the second bus bar 25 and the terminal, the first bus bar 21 or the second bus bar 25 and the terminal are kept in contact with each other, and the first bus bar 21 or the second bus bar 25 and the external conductive wire are connected to each other.

The second frame 40 presses the first bus bar 21 and the second bus bar 25 toward the first frame 31. The second frame 40 supports the circuit board 70. The second frame 40 includes a frame part 41 and a proximal end portion holding part 45. The second frame 40 is an integrally molded article that has been integrally molded in a shape including the frame part 41 and the proximal end portion holding part 45.

The frame part 41 is formed in a tubular shape that is open at the top and the bottom. The frame part 41 surrounds the periphery of the in-frame accommodating parts 22 and 26. Also, the frame part 41 surrounds the circuit board 70. A circuit board supporting part 42 and a rib 44 are provided inward of the frame part 41.

Here, four circuit board supporting parts 42 are provided. A positioning projection 43 is provided on a bearing surface of one of the four circuit board supporting parts 42. The positioning projection 43 fits into a positioning hole 71 formed in the circuit board 70. Accordingly, the circuit board 70 is positioned relative to the second frame 40. A screw hole 42h is formed in a bearing surface of each of the remaining three of the four circuit board supporting parts 42. The circuit board 70 is fixed to the second frame 40 by fastening screws to the screw holes 42h and screw insertion holes 72 of the circuit board 70 in a state in which the circuit board 70 is supported by the bearing surfaces of the four circuit board supporting parts 42 while being positioned by the positioning projection 43.

Here, five ribs 44 are provided. The ribs 44 are formed at a lower position than the circuit board supporting parts 42 are. Ribs 44A and 44B connect inner surfaces of the frame parts 41 to each other. The ribs 44A and 44B intersect each other (here, are orthogonal to each other). The rib 44A traverses between the detection target portion 22b and a part of the placement portion 22a on which the main bodies 61 are placed. The rib 44B connects two circuit board supporting parts 42 to each other. The two circuit board supporting parts 42 are circuit board supporting parts 42 each provided with the positioning projection 43. A rib 44C connects the rib 44A and an inner surface of the frame part 41 to each other. A rib 44D connects the rib 44A and one circuit board supporting part 42 to each other. The ribs 44C and 44D extend parallel to the rib 44B. The rib 44E connects the rib 44B and an inner surface of the frame part 41 to each other. The rib 44E extends parallel to the rib 44A. The ribs 44 press the first bus bar 21 and the second bus bar 25 toward the first frame 31.

The rib 44C is provided with the proximal end portion holding part 45. The proximal end portion holding part 45 holds a proximal end portion of the wiring part 54 that extends continuously with the detection main body part 52. Specifically, a groove 45a is formed in an upper surface of the rib 44C. The groove 45a is open upward. The groove 45a is formed so as to traverse the rib 44C. The proximal end portion of the wiring part 54 is fitted in the groove 45a. A bottom surface of the groove 45a constitutes a support surface for the proximal end portion of the wiring part 54. Opposite side surfaces of the groove 45a press the proximal end portion from opposite lateral sides. The width of the groove 45a may be set to be larger than the width of the proximal end portion of the wiring part 54, and the proximal end portion may be held in the groove 45a using an adhesive, or the width of the groove 45a may be set to be the same as, or smaller than the width of the proximal end portion of the wiring part 54, and the proximal end portion of the wiring part 54 may be press-fitted into the groove 45a.

Window parts 46 are formed in the second frame 40. The window parts 46 are formed adjacent to the frame part 41. The window parts 46 expose the outward extending parts 23 and 27 and the stud bolts SB. Peripheral edges of the window parts 46 press outer edge portions of the outward extending parts 23 and 27.

The temperature detection member 50 detects the temperature of the bus bar 20. Here, in order to detect the temperature of the switching elements 60, the temperature detection member 50 detects the temperature of the bus bar 20. The temperature detection member 50 detects the temperature of the first bus bar 21. A temperature detection result from the temperature detection member 50 is supplied to a control element. If the temperature of the switching elements 60 (i.e., the temperature detected by the temperature detection member 50) exceeds a predetermined upper limit temperature, the control element switches off all of the switching elements 60. The predetermined upper limit temperature is a temperature that is lower than the temperature of the switching elements 60 when overheated. That is, the control element protects the switching elements 60 from overheating. If the switching elements 60 are switched off based on the temperature of the switching elements 60, the control element controls the switching elements 60 to remain off at least until the temperature of the switching elements 60 falls below a predetermined safe temperature. The predetermined safe temperature is a temperature sufficiently lower than the predetermined upper limit temperature.

The temperature detection member 50 includes a detection main body part 52, a wiring part 54, and a thermal connection member 56. The temperature detection member 50 is held by one or more holding parts 38 and 45.

The detection main body part 52 is provided so as to be capable of detecting the temperature of a detection target. The detection main body part 52 includes a temperature sensitive element main body, and a pair of lead wires drawn from the temperature sensitive element main body. For example, the temperature sensitive element main body is a thermistor or the like whose resistance value varies according to temperature.

The wiring part 54 extends from the detection main body part 52. A proximal end portion (one end portion) of the wiring part 54 is electrically connected to the detection main body part 52. A distal end portion (the other end portion) of the wiring part 54 is electrically connected to the circuit board 70. The wiring part 54 is a pair of insulated wires, for example. The pair of insulated wires and the pair of lead wires are connected to each other. A protective member 55 is provided at the proximal end portion of the wiring part 54. The protective member 55 is a molded resin part or made of a cured adhesive, for example. The protection member 55 may be a protective tube or the like. The portion at which the protection member 55 is provided is held by the proximal end portion holding part 45. Note that the proximal end portion of the wiring part 54 refers to a portion extending from the portion connected to at least the detection main body part 52 to the portion held by the proximal end portion holding part 45. The distal end portion of the wiring part 54 refers to a portion that is connected to at least the circuit board 70.

The thermal connection member 56 thermally connects the detection main body part 52 and the bus bar 20 to each other. The connection portion holding part 38 holds a portion where the thermal connection member 56 and the bus bar 20 are thermally connected to each other. The thermal connection member 56 includes a fixing part 57 and a mounting part 58. The thermal connection member 56 is one plate member formed in a bent shape, and has a shape including the fixing part 57 and the mounting part 58. The thermal connection member 56 is also called a lug terminal or the like. The thermal connection member 56 is made of a material that has good thermal conductivity. The thermal connection member 56 is made of a metal such as aluminum or a copper. The thermal connection member 56 need only be a member that has thermal conductivity, and may be a terminal other than a lug terminal.

The fixing part 57 is formed in a plate shape that is elongated in one direction. A through hole 57h is formed in the fixing part 57. The fixing part 57 is supported by the first bus bar 21. A bolt B is passed through the through hole 57h. The bolt B passed through the through holes 22h and 57h is fixed to a nut N. The thermal connection member 56 and the bus bar 20 are fixed by the bolt B and the nut N using the through holes 22h and 57h. The mounting part 58 extends from the fixing part 57.

The mounting part 58 includes an extending piece 58a and fixing pieces 58b and 58c. The extending piece 58a extends from the fixing part 57. The detection main body part 52 is placed on the extending piece 58a. The extending piece 58a is supported by a support surface 45b of the proximal end portion holding part 45. The fixing pieces 58b and 58c are provided at an interval therebetween along the longitudinal direction of the extending piece 58a. The fixing piece 58b is provided at a position closer to the fixing part 57 than the fixing piece 58c is. A pair of the fixing pieces 58b are provided so as to rise from side edges of the extending piece 58a. The fixing pieces 58b surround the detection main body part 52. The fixing pieces 58b are crimped around the detection main body part 52. The fixing piece 58c is provided at a distal end portion of the extending piece 58a. A pair of the fixing pieces 58c are provided so as to rise from opposite side edges of the extending piece 58a. The fixing pieces 58c surround the wiring part 54. The fixing pieces 58c are crimped around the wiring part 54. Here, the fixing pieces 58c are crimped around the protection member 55. The portion where the fixing pieces 58c are provided is held by the proximal end portion holding part 45. Note that the fixing pieces 58c have been omitted from FIGS. 1 and 2.

The thermal connection member 56 is supported by an upper surface of the first bus bar 21 at the connection portion holding part 38. Here, the fixing part 57 is supported by an upper surface of the detection target portion 22b. The thermal connection member 56 is supported by the support surface 45b of the proximal end portion holding part 45 at the proximal end portion holding part 45. The support surface 45b is a bottom portion of the groove 45a. Here, the extending piece 58a is supported by the support surface 45b. As shown in FIG. 4, the height of the support surface 45b of the proximal end portion holding part 45 is smaller than the height of the upper surface of the first bus bar 21 at the connection portion holding part 38. This allows the thermal connection member 56 to easily come into surface contact with the first bus bar 21 so that favorable thermal conductivity can be easily achieved.

FIG. 4 shows a state in which the thermal connection member 56 is elevated from the support surface 45b. For example, the elevated portion is provided with an adhesive that also fixes the thermal connection member 56. Accordingly, the thermal connection member 56 is supported by the support surface 45b via the adhesive. The thermal connection member 56 may be directly in contact with and supported by the support surface 45b by being bent at an intermediate portion of the extending piece 58a. The thermal connection member 56 may also remain elevated from the support surface 45b.

The temperature detection member 50 is held at the connection portion holding part 38 by the bolt B and the nut N. The temperature detection member 50 is held at the proximal end portion holding part 45 using an adhesive or through press-fitting. As such an adhesive, an adhesive having a holding force weaker than the holding force provided by the bolt and the nut is used. For such press-fitting, the width of the proximal end portion holding part 45 is set such that the holding force obtained through press-fitting is weaker than the holding force provided by the bolt and the nut. Accordingly, the holding force of the connection portion holding part 38 is greater than the holding force of the proximal end portion holding part 45. Here, the holding force refers to a force required to move the temperature detection member 50 held by the holding parts 38 and 45 in the front-rear direction, the left-right direction, the up-down direction, or the like.

The switching elements 60 switch the first bus bar 21 and the second bus bar 25 on or off. That is, the first bus bar 21 and the second bus bar 25 are connected to each other when the switching elements 60 are on. Accordingly, a current flows from the power supply to the first load through the switching elements 60. The connection between the first bus bar 21 and the second bus bar 25 is disconnected when the switching elements 60 are off. At this time, the connection between the power supply and the first load is disconnected. When the connection between the power supply and the first load is disconnected, power is supplied to the first load from an auxiliary power supply (e.g., a sub-battery) directly connected to the first load. Note that the switching elements 60 are not limited to the field-effect transistors 60. The number of switching elements 60 need not be five, and at least one switching element 60 may be provided.

The circuit board 70 is a control board that controls the switching elements 60. The control element (not shown) is mounted to the circuit board 70. For example, the control element is electrically connected to the gate terminals 64 via a circuit on the circuit board 70 and the third bus bars 28. The control element is a microprocessor (MPU: Micro Processing Unit), for example. For example, a connector is connected to the control element. The connector is provided at a peripheral edge portion of the circuit board 70. A control signal is input to the control element from outside the electrical junction box 10 via a signal line connected to the connector. The control element switches each of the switching elements 60 on or off in accordance with the input control signal. For example, if a control signal indicating that the starter is to start operating is input, the control element switches off all of the switching elements 60. After the engine has been started by the starter, the control element switches on all of the switching elements 60.

The positioning hole 71 for passing the positioning projection 43 therethrough is formed in the circuit board 70. The positioning hole 71 may be formed to have the same size as, or to be larger than the positioning projection 43. Screw insertion holes 72 are formed in the circuit board 70 at positions corresponding to the screw holes 42h. The screw insertion holes 72 may have the same size as, or a size different from the size of the positioning hole 71. When the size of the positioning hole 71 and the size of the screw insertion holes 72 are different from each other, the positioning hole 71 and the screw insertion holes 72 can be easily distinguished from each other. Here, the screw insertion holes 72 is formed to be larger than the positioning hole 71. Through holes 73 and 74 are formed in the circuit board 70. The other end portion of the wiring part 54 is connected to the through hole 73. The other end portion of each gate terminal 64 is connected to the corresponding through hole 74. For example, the other end portion of the wiring part 54 and the other end portion of the gate terminals 64 are passed through the through holes 73 and 74, and electrically connected and fixed thereto using solder.

The cover 80 closes the upper opening of the frame 30. The cover 80 closes the upper opening of the frame part 41. The cover 80 is made of an insulating material such as a resin, or a metal material, for example. For example, the cover 80 is locked and externally fitted to the frame part 41 by an engagement structure using a locking projection. The fixing may also be achieved through screwing.

The heat dissipation member 82 releases heat from the first bus bar 21 and the second bus bar 25. The heat dissipation member 82 is a heat sink, for example. The heat dissipation member 82 is made of a material having high thermal conductivity, for example. The heat dissipation member 82 is made of a metal such as aluminum, for example. The heat dissipation member 82 is provided below the frame 30. The heat dissipation member 82 is formed to have a size corresponding to the size of the frame 30. The heat dissipation member 82 closes the lower opening of the frame 30. The frame 30 and the heat dissipation member 82 form a box member including the frame 30 serving as a peripheral wall, and the heat dissipation member 82 serving as a bottom wall. Note that a heat dissipation fin may be provided on a lower surface of the heat dissipation member 82. For example, the heat dissipation member 82 and the second frame 40 are screwed to each other. Also, the first bus bar 21, the second bus bar 25, the first frame 31, and the interposed member 84 that are disposed between the heat dissipation member 82 and the second frame 40 are sandwiched between the heat dissipation member 82 and the second frame 40.

The interposed member 84 is interposed between the heat dissipation member 82 and the first and second bus bars 21 and 25. The interposed member 84 includes an insulating member made of a material having insulating properties. The insulating member insulates the first and second bus bars 21 and 25 from the heat dissipation member 82. For example, the interposed member 84 includes an insulating sheet and a grease member. The insulating sheet is formed to have a size corresponding to the size of the heat dissipation member 82. The insulating sheet is disposed between the bus bar 20 and the heat dissipation member 82. The grease member is provided at least either between the insulating sheet and the bus bars 21 and 25, or between the insulating sheet and the heat dissipation member 82. The grease member increases thermal conductivity by filling the gap between the insulating sheet and the bus bars 21 and 25, and the gap between the insulating sheet and the heat dissipation member 82. The grease member is a semisolid member, and can enter gaps. Alternatively, the grease member may be a member, such as an adhesive, that is cured after being in a semisolid state.

With the electrical junction box 10 configured in the above-described manner, the holding parts 38 and 45 that hold the temperature detection member 50 are integrally molded with the frame 30 that holds the bus bars 21 and 25. Accordingly, it is possible to hold the temperature detection member 50 while keeping the number of components as low as possible.

Since the proximal end portion holding part 45 is provided as the holding part, the detection main body part 52 that is located close to the proximal end portion holding part 45 is stabilized.

Since the connection portion holding part 38 is provided, the thermal connection portion is further held. Here, the connection portion holding part 38 can hold the nut N.

Since the holding force of the connection portion holding part 38 is greater than the holding force of the proximal end portion holding part 45, the proximal end portion holding part 45 is more likely to rattle than the connection portion holding part 38, and thus stress is less likely to be applied to the connection portion holding part 38.

Since the height of the support surface 45b of the proximal end portion holding part 45 is lower than the height of the upper surface of the bus bar 21 at the connection portion holding part 38, the bus bar 21 and the thermal connection member 56 can easily come into surface contact with each other at the connection portion.

Embodiment 2

Figure 5:
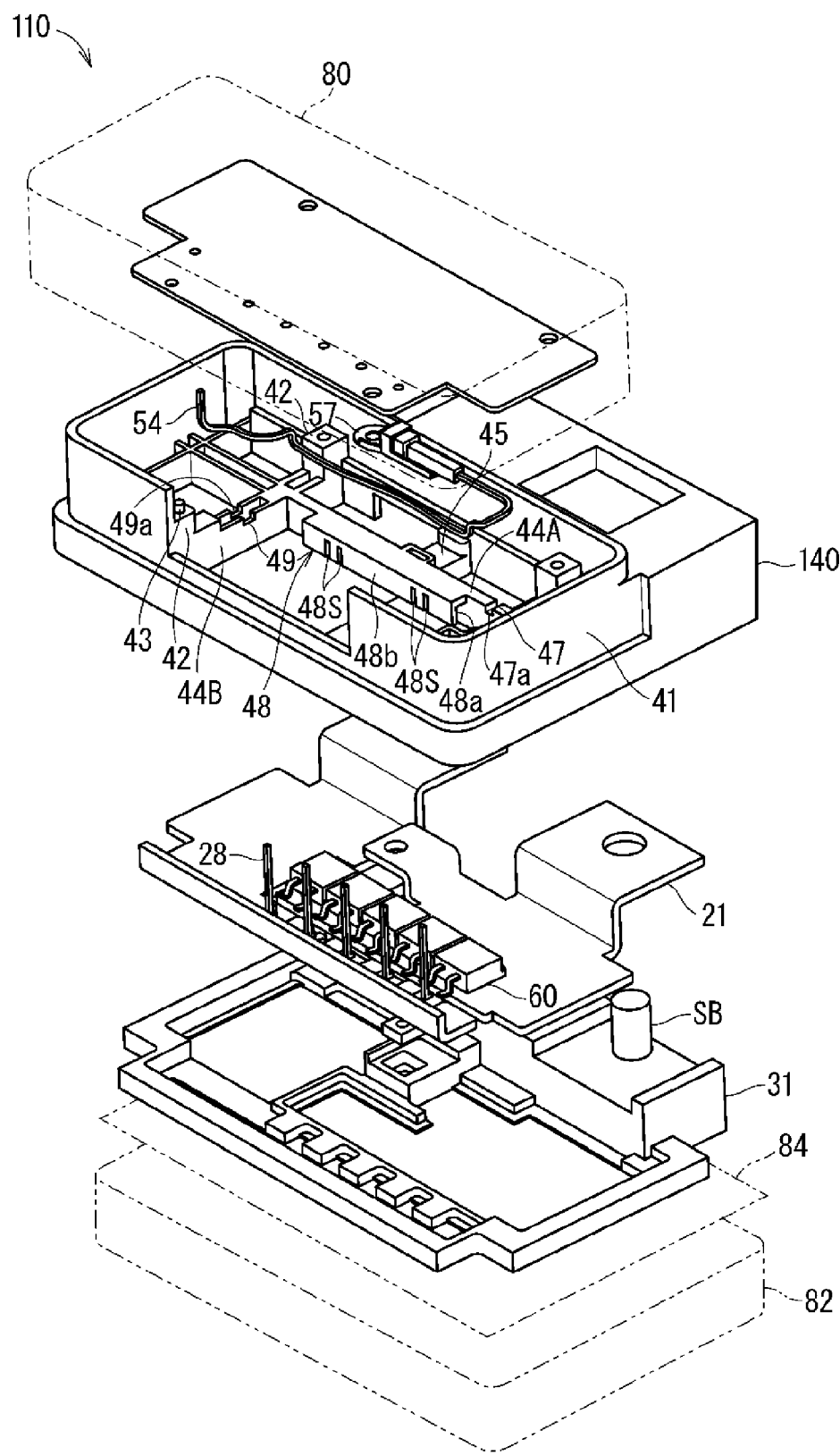
FIG. 5 is an exploded perspective view showing an electrical junction box according to Embodiment 2.
Figure 6:
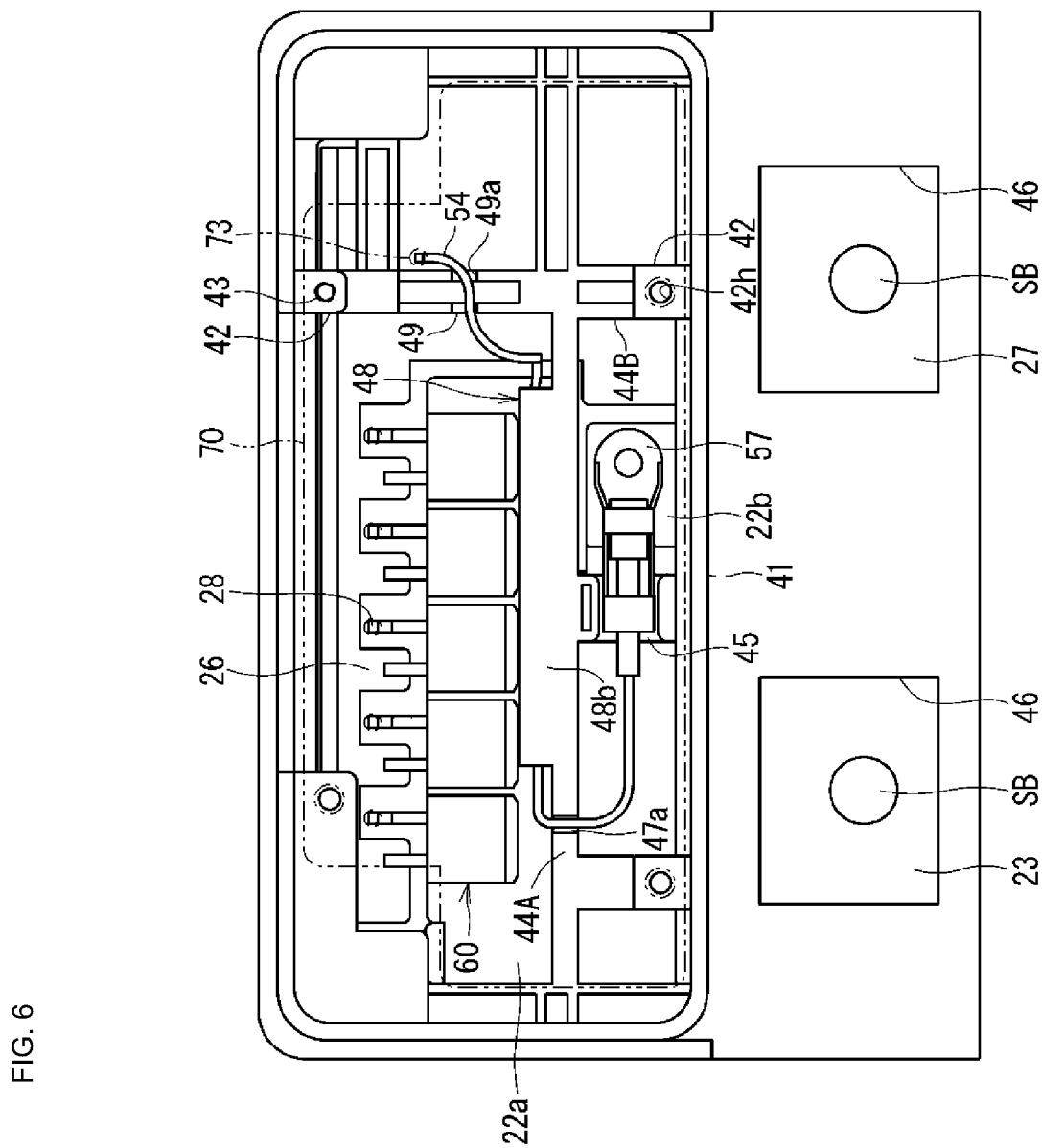
FIG. 6 is a plan view showing the electrical junction box according to Embodiment 2.
Figure 7:
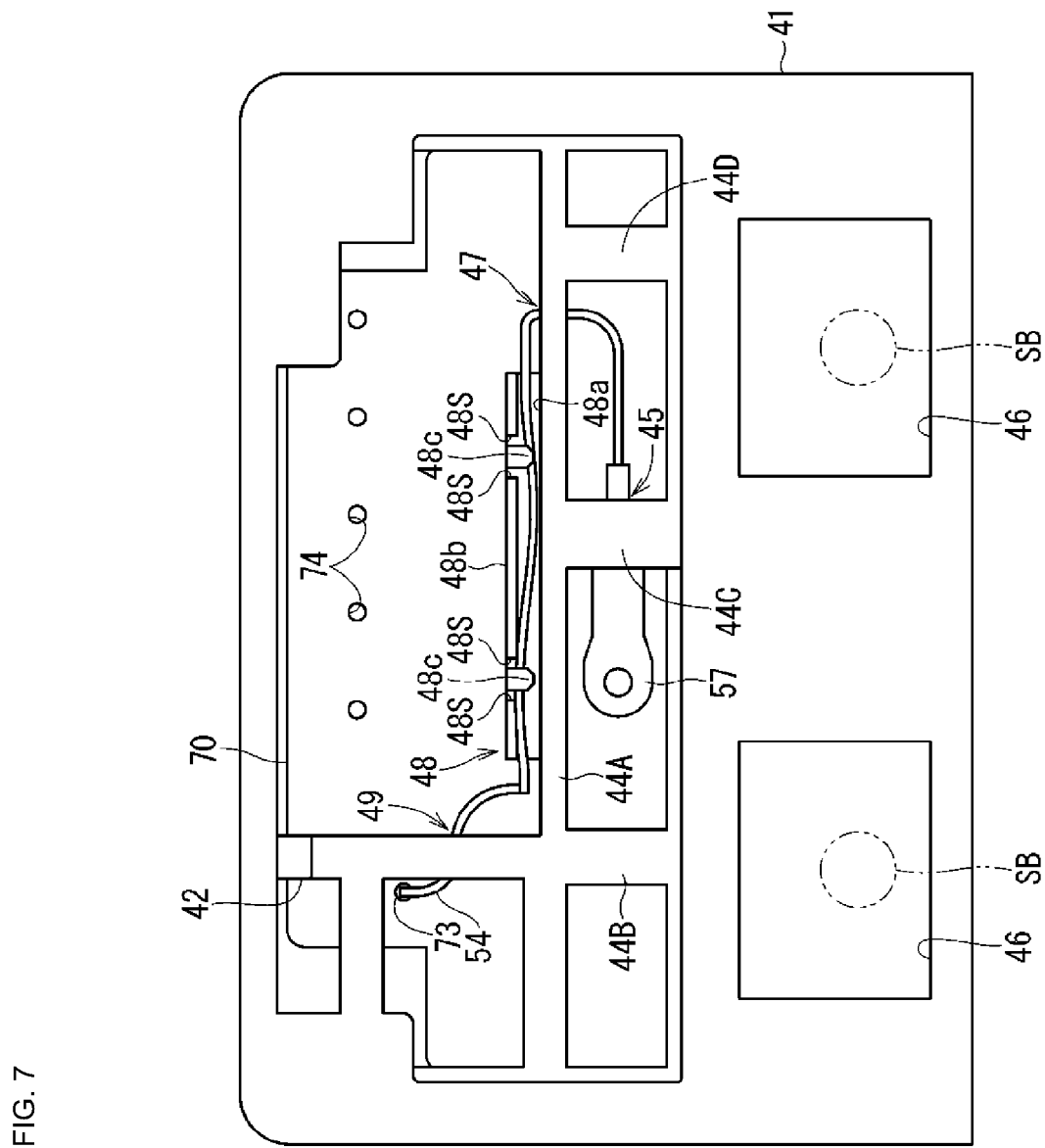
FIG. 7 is a bottom view showing the electrical junction box according to Embodiment 2.

An electrical junction box according to Embodiment 2 will be described. FIG. 5 is an exploded perspective view showing an electrical junction box 110 according to Embodiment 2. FIG. 6 is a plan view showing the electrical junction box 110 according to Embodiment 2. In FIG. 6, the cover 80 has been omitted. FIG. 7 is a bottom view showing the electrical junction box 110 according to Embodiment 2. In FIG. 7, the bus bar 20 and the second frame 40 have been omitted. Note that the same constituent elements as those described thus far are denoted by the same reference numerals, and the descriptions thereof have been omitted.

The electrical junction box 110 differs from the electrical junction box 10 in that intermediate holding parts 47, 48, and 49 are provided in addition to the holding parts 38 and 45. The intermediate holding parts 47, 48, and 49 are provided on a second frame 140. The second frame 140 is an integrally molded article that has been integrally molded in a shape including the frame part 41, the proximal end portion holding part 45, and the intermediate holding parts 47, 48, and 49. The components of the electrical junction box 110 other than the second frame 140 are the same as those of the electrical junction box 10.

The intermediate holding parts 47, 48, and 49 are provided in this order from the proximal end portion holding part 45 along the direction in which the wiring part 54 extends. The intermediate holding parts 47, 48, and 49 hold an intermediate portion of the wiring part 54 at positions different from each other. Grooves 47a, 48a, and 49a are formed in the intermediate holding parts 47, 48, and 49, respectively. The intermediate portion of the wiring part 54 is accommodated in the grooves 47a, 48a, and 49a. The intermediate holding parts 47 and 48 are provided on the rib 44A. The intermediate holding part 49 is provided on the rib 44B. Note that the intermediate portion of the wiring part 54 is a portion between the proximal end portion and the distal end portion described above.

The intermediate holding part 47 is provided at a position next to the proximal end portion holding part 45 in the order from the proximal end portion toward the distal end portion along the direction in which the wiring part 54 extends. The intermediate holding part 47 is an example of the proximal end-side intermediate portion holding part. The groove 47a is formed so as to traverse the rib 44A. The groove 47a is formed in the upper surface of the rib 44A. The groove 47a is open upward. The width of the groove 47a is larger than the width of the wiring part 54.

At the intermediate holding part 48, the groove 48a is formed extending parallel to the rib 44A. Specifically, a protrusion 48b protruding laterally from the rib 44A is provided. The protrusion 48b is formed to have an L-shape cross-section. The protrusion 48b includes a protruding piece that protrudes laterally from the rib 44A, and a hanging piece that is provided at a distal end of the protruding piece at an interval from the rib 44A. A groove 47a is formed between the protrusion 48b and the rib 44A. The protruding piece of the protrusion 48b constitutes a bottom portion of the groove 47a. The hanging piece of the protrusion 48b and the rib 44A constitute side walls of the groove 47a.

The protrusion 48b is formed in a region between the groove 47a and the rib 44B along the longitudinal direction of the rib 44A. The protrusion 48b is formed on an intermediate portion of the rib 44A that is located between the groove 47a and the rib 44B. The length of the protrusion 48b is longer than the length of the groove 47a (the width of the rib 44A). The length of the protrusion 48b is set to be greater than or equal to half the interval between the groove 47a of the rib 44A and the rib 44B, for example. The groove 48a is formed in a lower surface of the protrusion 48b. The groove 48a is open downward. The groove 48a is provided over the entire protrusion 48b along the direction in which the rib 44A extends. The width of the groove 48a is larger than the width of the wiring part 54.

The intermediate holding part 48 is provided with retaining pieces 48c. The retaining pieces 48c protrude from an edge portion of an opening of the groove 48a. The retaining pieces 48c close the opening of the groove 48a. Here, the retaining pieces 48c protrude from a distal end of the hanging piece of the protrusion 48b toward the rib 44A. The width of each retaining piece 48c is smaller than the length of the protrusion 48b. Slits 48S are formed at positions on both sides of a portion of the hanging piece of the protrusion 48b that extends continuously with each retaining piece 48c. Accordingly, the portion of the hanging piece that extends continuously with the retaining piece 48c constitutes an elastic piece that can be easily deformed elastically. As a result of the elastic piece being elastically deformed, the wiring part 54 can easily move from the opening over the retaining pieces 48c, and be accommodated in the groove 48a.

The intermediate holding part 49 is provided at a position closest to the connection portion with the circuit board 70 along the direction in which the wiring part 54 extends. The groove 49a is formed so as to traverse the rib 44B. The groove 49a is formed in an upper surface of the rib 44B. The groove 49a is open upward. The width of the groove 49a is larger than the width of the wiring part 54.

The grooves 47a and 49a are examples of the first groove. The intermediate holding parts 47 and 49 are examples of the first intermediate holding part. The groove 48a is an example of the second groove. The intermediate holding part 48 is an example of the second intermediate holding part. The grooves 47a and 49a and the groove 48a are open in directions opposite to each other.

The wiring part 54 is fitted to the grooves 47a, 48a, and 49a, but is not press-fitted thereinto. Accordingly, the holding force at the intermediate holding parts 47, 48, and 49 is weaker than the holding force of the proximal end portion holding part 45 and the holding force of the connection portion holding part 38. Similarly, the holding force at the intermediate holding parts 47, 48, and 49 is weaker than the holding force at the connection portion between the wiring part 54 and the circuit board 70.

With the electrical junction box 110 configured in the above-described manner, it is also possible to achieve the same effects as those of Embodiment 1. With the electrical junction box 110, the holding force at the proximal end-side intermediate portion holding part 47 is weaker than the holding force of the proximal end portion holding part 45 and the holding force of the connection portion holding part 38. Accordingly, the proximal end-side intermediate portion holding part 47 is more likely to rattle than the connection portion holding part 38 and the proximal end portion holding part 45, and thus stress is less likely to be applied to the proximal end portion holding part 45 and the connection portion holding part 38.

Since the intermediate holding part 48 is formed to be longer than the intermediate holding parts 47 and 49, an excess length of the wiring part 54 is absorbed by the intermediate holding part 48. Accordingly, the wiring part 54 is less likely to dangle.

Since the intermediate holding part 48 is provided with the retaining pieces 48c, the wiring part 54 is prevented from being dislodged from the longer groove 48a.

Since the grooves 47a and 49a and the groove 48a are open in directions opposite to each other, the wiring part 54 is held at the intermediate holding parts 47 and 49 and the intermediate holding part 48 from sides opposite to each other.

Since the rib 44B in which the groove 49a is formed extends from the circuit board supporting part 42 on which the positioning projection 43 is formed, the intermediate holding part 49 can hold the wiring part 54 at a position close to the positioning projection 43.

Since the holding force at the intermediate holding parts 47, 48, and 49 is weaker than the force holding the wiring part 54 at the electrical connection portion between the wiring part 54 and the circuit board 70, stress is less likely to be applied to the electrical connection portion.

Modifications

In each of the embodiments, the bus bars 21 and 25 are described as constituting the circuit that is to be switched by the switching elements 60. However, this is not an essential configuration. The bus bars 21 and 25 may be used for a circuit different from the circuit that is to be switched.

In each of the embodiments, some of the holding parts 38 and 45, 47, 48, and 49 may be omitted. For example, one of the holding parts 38 and 45 may be omitted in Embodiment 1. For example, in Embodiment 2, one or more of the intermediate holding parts 47, 48, and 49 of the holding parts 38 and 45, 47, 48, 49 may be used, and the rest of the holding parts may be omitted.

The configurations described in the embodiments and the modification may be combined as appropriate as long as there are no mutual inconsistencies.

The invention claimed is:

1. An electrical junction box comprising:
a bus bar;
a frame that holds the bus bar; and
a temperature detection member that detects the temperature of the bus bar,
wherein the temperature detection member includes a detection main body part capable of detecting temperature, and a wiring part extending from the detection main body part, and is held by one or more holding parts,
the frame is integrally molded in a shape including a frame part surrounding a periphery of at least a part of the bus bar that includes a detection target portion to be subjected to detection by the temperature detection member, and at least one holding part of the one or more holding parts,
the at least one holding part of the one or more holding parts is provided so as to be located inward of the frame part, wherein the one or more holding parts include a proximal end portion holding part that holds a proximal end portion of the wiring part that extends continuously with the detection main body part, and
wherein the temperature detection member further includes a thermal connection member that thermally connects the detection main body part and the bus bar to each other, and the one or more holding parts include a connection portion holding part that holds a portion where the thermal connection member and the bus bar are thermally connected to each other.

2. The electrical junction box according to claim 1, wherein a hole is formed in each of the thermal connection member and the bus bar,
each of the thermal connection member and the bus bar is fixed by a bolt and a nut using the hole,
the connection portion holding part has a support surface that supports the bus bar,
a recess is formed in the support surface, and
the nut fits in the recess.

3. The electrical junction box according to claim 2, wherein the holding force of the connection portion holding part is greater than the holding force of the proximal end portion holding part.

4. The electrical junction box according to claim 2, wherein the thermal connection member is supported by an upper surface of the bus bar at the connection portion holding part, and is supported by a support surface of the proximal end portion holding part at the proximal end portion holding part, and
the height of the support surface of the proximal end portion holding part is lower than the height of the upper surface of the bus bar at the connection portion holding part.

5. The electrical junction box according to claim 2, wherein the one or more holding parts include a proximal end-side intermediate portion holding part that holds an intermediate portion of the wiring part,
the proximal end-side intermediate portion holding part is provided at a position next to the proximal end portion holding part in order from the proximal end portion toward a distal end portion along a direction in which the wiring part extends, and
the holding force at the proximal end-side intermediate portion holding part is weaker than the holding force of the proximal end portion holding part and the holding force of the connection portion holding part.

6. The electrical junction box according to claim 1, wherein the one or more holding parts include a first intermediate holding part and a second intermediate holding part that hold an intermediate portion of the wiring part at positions different from each other,
a first groove that traverses a rib protruding from the frame part is formed in the first intermediate holding part,
a second groove parallel to the rib is formed in the second intermediate holding part,
the second groove is formed to be longer than the first groove, and
the intermediate portion of the wiring part is accommodated in each of the first groove and the second groove.

7. The electrical junction box according to claim 6, wherein the second intermediate holding part is provided with a retaining piece protruding from an edge portion of an opening of the second groove so as to close the opening.

8. The electrical junction box according to claim 6, wherein the first groove and the second groove are open in directions opposite to each other.

9. The electrical junction box according to claim 6, further comprising:
a circuit board to which a distal end portion of the wiring part is to be electrically connected,
wherein the frame includes a first frame that supports the bus bar, and a second frame that supports the circuit board and that presses the bus bar toward the first frame,
a positioning projection that positions the circuit board is formed inward of the frame part of the second frame, and
the rib in which the first groove is formed extends from a circuit board supporting part on which the positioning projection is formed.

10. The electrical junction box according to claim 9, wherein the holding force at the first intermediate holding part is weaker than the force holding the wiring part at an electrical connection portion between the wiring part and the circuit board.

* * * * *